United States Patent [19]

Keller

[11] Patent Number: 4,587,325

[45] Date of Patent: May 6, 1986

[54] PROCESSABLE AND STABLE CONDUCTIVE POLYMERS FROM DIETHER-LINKED BISORTHODINITRILE MONOMERS

[75] Inventor: Teddy M. Keller, Alexandria, Va.

[73] Assignee: The United States of America as represented by the Secretary of the Navy, Washington, D.C.

[21] Appl. No.: 690,015

[22] Filed: Jan. 9, 1985

[51] Int. Cl.⁴ ............................................. C08G 83/00
[52] U.S. Cl. .................... 528/172; 252/500;
528/173; 528/183; 528/185; 528/207; 528/208;
528/210; 528/211; 528/206; 528/335; 528/347;
528/348; 528/353
[58] Field of Search ............... 528/172, 173, 183, 185,
528/207, 208, 210, 211, 206, 347, 348, 335, 353;
252/500

[56] References Cited

U.S. PATENT DOCUMENTS

| | | | |
|---|---|---|---|
| 4,223,123 | 9/1980 | Keller et al. | 528/210 |
| 4,304,896 | 12/1981 | Keller et al. | 528/210 |
| 4,408,035 | 10/1983 | Keller | 528/210 |
| 4,409,382 | 10/1983 | Keller | 528/210 |
| 4,410,676 | 10/1983 | Keller | 528/210 |
| 4,500,459 | 2/1985 | Hotta et al. | 528/210 |

*Primary Examiner*—Lester L. Lee
*Attorney, Agent, or Firm*—Robert F. Beers; Sol Sheinbein; Wendell R. Guffey

[57] ABSTRACT

A diether-linked bisorthodinitrile monomer having the formula:

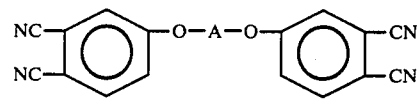

is mixed with an amine curing agent and heated to a temperature sufficient to induce polymerization. The resulting polymer has a range of conductivity which is a function of the cure time and temperature.

15 Claims, 1 Drawing Figure

PROCESSABLE AND STABLE CONDUCTIVE POLYMERS FROM DIETHER-LINKED BISORTHODINITRILE MONOMERS

BACKGROUND OF THE INVENTION

The present invention pertains to conductive polymers and, more particularly, to conductive polymers prepared by polymerizing bisorthodinitrile monomers having diether linking groups.

Various polymers, particularly epoxides and thermoplastics, are becoming very useful in industry as substitutes for metals when reinforced by strong fibers and molded into structural materials. These materials have superior mechanical properties and are lighter and more economical to produce and transport. They, however, lack the thermal stability to operate at high temperatures and tend to oxidize and become brittle over time. They also lack the conductive characteristics of most metals they are intended to replace.

The polycyananines, epoxides, thermoplastics, and various other polymers can be made conductive, to a limited extent, by loading with metals or other conductive materials. Attempts to increase the conductivity of these reinforced polymers has mostly been limited to the uniform dispersion of fillers throughout the polymeric matrix. Most of the currently marketed conductive materials are based on the incorporation of materials such as graphite, metals, metallized glass, and carbon black into a polymeric matrix. This technique, however, has the disadvantage of increasing the cost of production since the process is more complicated and the materials are more expensive. Additionally, the greater weight due to the added filler limits the polymer use where very light weight materials are needed and adds to transportation costs.

Although intensive research efforts are being pursued to synthesize and develop conductive polymers which are intrinsically conductive, attempts to produce conductive organic polymers in the absence of dopants have had limited success. Tuemmler, U.S. Pat. No. 3,245,965, discloses a phthalocyanine which becomes semiconductive when heated. Perez-Albuerne, U.S. Pat. No. 3,629,158, discloses a composition having a polymeric anion and a fused polyacrylic aromatic hydrocarbon cation which increases in conductivity when heated. Katon, U.S. Pat. No. 3,267,115, discloses a conductive polymeric composition produced by reacting tetracyanoethylene with a metal salt.

Recently, a new class of polymers has been synthesized using bridged diphthalonitriles. These polymers have the thermal stability and structural properties necessary to replace metals in high temperature-oxidative environments but, unfortunately, lack the conductive properties of the metals they replace. Keller, U.S. Pat. No. 4,351,776, discloses a halogen-alkyl bisorthodinitrile useful in synthesizing phthalocyanines and polyphthalocyanines having high thermal stability. Keller, U.S. Pat. No. 4,315,093, discloses fluorinated polyphthalocyanines that have good thermal stability but are nonconductive. Keller, U.S. Pat. No. 4,259,471, discloses a polyphenylether-bridged polyphthalocyanine with exceptional thermal stability. In particular, Keller, U.S. Pat. No. 4,304,896, discloses the diether-linked polyphthalocyanine composition used to produce the conductive polymers of the present invention. Several polymers with delocalized pi-electron structures such as polyacetylene, poly(p-phenylene), poly(p-phenylene sulfide), and polypyrrole, have been shown to exhibit conductivity by the addition of either electron donor or electron acceptor dopants. However, a number of problems such as the inability to fabricate into films, fibers, or plastic components, conductive instability in air and boiling water, poor mechanical properties, and loss of dopant with a rise in temperature have limited their usefulness.

In recent years there has been an increasing interest in the development and utilization of intrinsically conductive organic polymers. The ideal electrically conductive polymer should exhibit good electronic conductivity, be oxidatively stable, have good mechanical properties and be normally processable. No conductive polymer with this combination of desirable properties has been reported.

Thus, synthetic polymers having the strength and thermal stability necessary to replace metals in many situations are available. There is, however, a need for a non-doped, conductive polymer having the strength and thermal stability to replace metals in situations where the material used must be conductive.

SUMMARY OF INVENTION

It is, therefore, an object of the present invention to provide a non-doped, conductive organic polymer having sufficient structural strength and thermal stability to replace conductive materials, particularly metals.

Another object of this invention is to develop this polymer from an easily processable, potentially low-cost phthalonitrile monomer.

Another object of this invention is to convert this polymer into a highly conductive material by thermal means.

Another object of this invention is to provide a polymer that can be made to conduct through the range from insulator to semiconductor to highly conductive materials by varying the temperature at which polymerization occurs.

These and other objects of the invention are achieved by polymerizing diether-linked bisorthodinitrile monomers with an amine curing agent at temperatures between the melting point of the monomers and thermal decomposition point for the polymers. The conductivity of the resulting polymer is increased linearly as a function of the polymerization temperature.

Other objects, advantages, and novel features of the present invention will become apparent from the following detailed description of the invention when considered in conjunction with the accompanying drawing.

DESCRIPTION OF THE INVENTION

Figure 1:
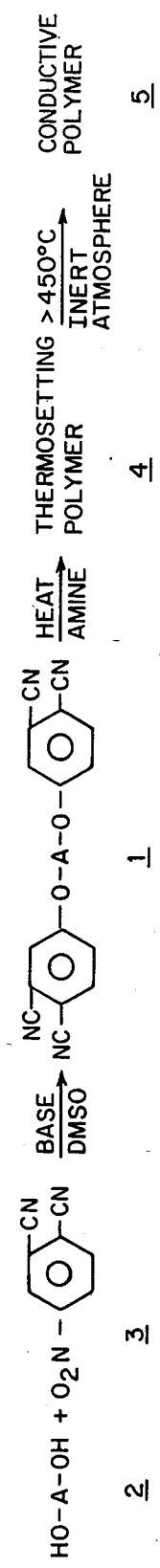
FIG. 1 outlines the reaction scheme used to prepare the conductive polymers from the monomer precursors.

Diether-linked bisorthodinitrile monomers prepared according to the method of U.S. Pat. No. 4,304,896 by Keller, incorporated by reference herein, having the structure:

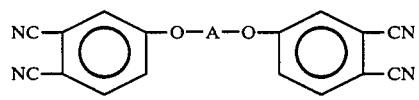

wherein A is selected from the group consisting of phenyl radicals linked at the meta or para positions; polyphenyl radicals, particularly biphenyl, linked at the meta or para positions; and fused aromatic poly-ring radicals, particularly naphthalene, phenanthrene and anthracene, are mixed with an amine curing agent and polymerized by heating to a temperature above the monomers melting point but below the temperature at which the polymers thermally decomposes. The conductive properties of the resulting polymer are a linear function of the polymerization temperature; the higher the temperature the more conductive the polymer. The polymer can be made nonconductive, semiconductive, or highly conductive simply by varying the temperature at which polymerization occurs.

The bisorthodinitrile monomer and amine mixture of the present invention can be polymerized by heating to the melting point of the monomers, but this reaction is very slow and will not produce the desired conductivity characteristics. It is therefore preferred that the monomers be polymerized at a temperature at least 15° C. above the melting point in order to have polymerization completed within a reasonable time. The atmosphere wherein the initial polymerization is accomplished can be oxygen-containing, inert, or a vacuum, with oxygen-containing being preferred. In the preferred method, the monomers are heated at about 15°-25° C. above their melting point until the viscosity begins to increase. The resulting material can be cooled to a frangible solid that can be stored for future use without further reaction (B-Stage). The resulting material can subsequently be heated to a temperature from about 15° C. above the melting point to the decomposition temperature of the polymer. Alternatively, the monomers can be directly heated until solidification occurs at a temperature from about 15° C. above their melting point to about the decomposition temperature of the resulting polymer (C-Stage). For either method, the resulting polymer can be made conductive in the range from insulator to conductor depending on the final cure temperature. The optimum cure temperature for a particular polymer will depend upon the desired conductivity of the sample compositions.

High temperatures further require a high degree of purity of all chemicals used in the invention because of the increased reactivity at elevated temperatures. For example at temperatures above 280° C., metal oxides can attach and destroy the benzene ring structure. For this reason, the preferred amounts of impurities are less than 100 ppm. Ion purities can, however, be present at the 300 ppm level without significantly affecting the conductivity of the final polymer.

Referring to FIG. 1, the phthalonitrile 1, used to fabricate the highly conductive polymer 5, is synthesized in high yield by the simple nucleophilic displacement of a nitro substituent ($NO_2$) from 4-nitrophthalonitrile 3 by the dipotassium salt of a bisphenol 2 in dry dimethyl sulfoxide (DMSO) under an inert atmosphere. When a weak base such as anhydrous potassium carbonate is used to form the salt, an amount in excess of stoichiometry appears to be necessary and the base must be added stepwise to ensure complete reaction. When a strong base such as potassium hydroxide is used, the salt is initially prepared and the by-product ($H_2O$) is removed before 3 is added. In both cases, the nucleophilic displacement reaction proceeds smoothly at room temperature.

The polymer 4 is easily processable from the melt of 1 into a void-free thermosetting material. The polymerization reaction is carried out in the presence of of an amine curing agent in either a single step by heating at 250°-300° C. until solidification occurs or stepwise to distinct stages. The latter method comprises heating the reacting mixture at 250°-300° C. until a certain viscosity is attained due to the onset of polymer formation (B-stage). The prepolymer can then be cooled to a frangible solid and can be stored indefinitely without further reaction. The prepolymer can then be remelted and heated until solidification occurs (C-stage) or can be pulverized and then processed in any shape or form desired.

Polymerization is believed to afford a very complex structural mixture. The amine, when present in minute quantities, probably initially attacks the nitrile components of 1 resulting in the formation of an N-substituted-3-iminoisoindoline unit, which then reacts with other nitrile substituents to form polymer 4. However, other cyano-additions involving macrocyclic polymeric materials, e.g., polytriazine and polyphthalocyanine formations, may also be present. No volatiles are formed during the polymerization which ensures the formation of a void-free polymer.

The polymer 4, which was initially developed as a potential high performance matrix material for composites, was found to exhibit a thermal stability similar to the aromatic polyimides. The thermal stability of 4 was measured in nitrogen using thermogravimetric analysis (TGA) equipment. The polymer remained stable to 500° C. followed by a gradual weight loss to about 17% at 700° C. Similar results were obtained when 4 was heated isothermally for longer periods at various temperatures.

When heated above 450° C., polymer 5 exhibits inherent conductive properties. The electrical conductivity can be varied and fine tuned in a controlled manner as a function of both the time and temperature, with properties ranging from insulator to semiconductor and approaching metallic conditions (see Tables 1 and 2). After being heated at 700° C. in an inert atmosphere, the polymer from 4,4'-bis(3,4-dicyanophenoxy) biphenyl exhibits a room temperature conductivity of $2.5 \times 10^{+1}$ $ohm^{-1}cm^{-1}$. The electrical conductivity did not change significantly even after the sample was left in contact with air for one year. When the polymer was further heated at 800° C., an increase in conductivity was observed. Interestingly, the polymer, after being heated at these elevated temperatures, retains its structural integrity and appears tough.

Primary consideration has been devoted to amine curing agents for the phthalonitrile 1 to reduce both the time and temperature for gelation. The amine and phthalonitrile are blended together and then heated at elevated temperatures to affect the cure. To be suitable for this process, the curing agent should possess the following requirements: it should generate a reactive intermediate that will react rapidly with excess phthalonitrile monomer; the reaction should afford a thermally stable link; the reaction should be initiated under convenient conditions where control of the reaction temperature is possible; no volatiles can be generated; the curing agent must not evolve from the sample during the curing process; and the curing agent must be compatible with the monomer so that it will be molecularly dispersed. Most aromatic amines, particularly m- and p-phenylenediamine, 4-aminophenyl ether, 4-aminophenyl sulfone, 4,4'-(p-phenylenedioxy) dianiline, and 4,4'-methylenedianiline have the thermal stability at elevated temperatures necessary to enhance polymerization in the present process. Although 4,4'-methylenedianiline is preferred, any primary, secondary, or tertiary amine will enhance the cure rate to a certain extent if it does not vaporize or decompose below the polymerization temperature. Aliphatic amines, however, are less desirable due to their thermooxidative instability. In the temperature range used for polymerization, 200° C. to 1200° C., the amine which is incorporated into polymer must be thermally stable.

The amine should constitute from 0.2 to 20 percent by weight of the reaction mixture. A range between 0.5 and 10 percent by weight is preferred; 1 to 2 percent by weight being most preferred.

The invention having been generally described, the following examples of the preparation of 4,4'-bis (3,4-dicyanophenoxy) biphenyl and 1,3-Bis (3,4-dicyanophenoxy) benzene and the conversion of these compounds into highly conductive organic polymers are given as particular embodiments of the invention and to demonstrate the practice and advantages thereof. It is understood that the examples are given by way of illustration and are not intended to limit the specification or the claims to follow in any manner.

EXAMPLE I

Synthesis of 4,4'-Bis (3,4-Dicyanophenoxy) Biphenyl 1

A mixture containing 4,4'-biphenol 2 (5.0 g, 0.027 mol), 4-nitrophthalonitrile 3 (9.7 g, 0.056 mol) and anhydrous potassium carbonate (9.6 g, 0.070 mol) in 60 ml of dry dimethyl sulfoxide was stirred at room temperature for 24 hours. The potassium carbonate was added in three portions. At this point, the reaction mixture was slowly poured into cold, dilute hydrochloric acid (200 ml). The crude precipitate was isolated by suction filtration, washed with water until neutral and dried. Purification was achieved by recrystallization from acetone-water to afford 11.2 g (95%) of 1, m.p. 232°–235° C.

A second mixture containing 4,4'-biphenol 2 (5.0 g, 0.027 mol), 50% aqueous potassium hydroxide (3.5 g, 0.054 mol, 85.6% pure), 60 ml of dimethyl sulfoxide and 30 ml of toluene was stirred at reflux for 4 hours under a nitrogen atmosphere and the water was azeotroped from the mixture with a Dean Stark trap. The toluene was removed by distillation and 4-nitrophthalonitrile 3 (9.6 g, 0.055 mol) was added to the reaction mixture at room temperature. The resulting dark mixture was poured into 200 ml of dilute hydrochloric acid. The white solid which separated was washed with water until neutral, dried, and washed with hot absolute ethanol which removed the impurities to yield 11.6 g (98%) of 1, m.p. 230°–232° C.

EXAMPLE II

Stepwise conversion of 4,4'-bis (3,4-Dicyanophenoxy) Biphenyl Into Highly Conductive Material The monomer 1 (1.32 g) was weighted into an aluminum planchet, melted and degassed at reduced pressure. An amine, 4,4'-methylenedianiline (0.013 g), was added to the melt and thoroughly mixed by stirring. The sample was placed in a preheated oven at 250° C. and heated in air for 2 hours. The temperature was increased to 280° C. and the sample was heated at this temperature for 24 hours. The sample which solidified during the 280° C. heat treatment was an insulator at this stage. The polymer was made highly conductive by successive heat treatments in an inert atmosphere at 300° C. (24 hours), at 400° C. (24 hours), at 500° C. (24 hours), at 600° C. (24 hours), at 700° C. (24 hours), and at 700° C. (100 hours). The electrical conductive results are shown in Table 1. For example, after 100 hours at 700° C., the room temperature conductivity is $2.5 \times 10^{+1}$ ohm$^{-1}$cm$^{-1}$. There was no significant change in the conductivity after one year exposure to air ($\sigma = 1.7 \times 10^{+1}$ ohm$^{-1}$cm$^{-1}$).

EXAMPLE III

Stepwise conversion of 4,4'-Bis(3,4-Dicyanophenoxy) Biphenyl Into Highly Conductive Material The monomer 1 (2.51 g) was weighed into an aluminum planchet, melted and degassed at reduced pressure. 4,4'-methylenedianiline (0.025 g) was added to the melt and thoroughly mixed by stirring. The sample was heated at 250° C. for 2 hours and at 280° C. for 24 hours. The solid polymer was made highly conductive by successive heat treatments in an inert atmosphere at 300° C. (100 hours), at 400° C. (100 hours), at 500° C. (100 hours), at 600° C. (100 hours), at 600° C. (200 hours), at 700° C. (100 hours) and at 800° C. (100 hours). The room temperature electrical conductivity, after being heat at 800° C. was $6.4 \times 10^{+1}$ ohm$^{-1}$cm$^{-1}$. The electrical conductivity at various stages is shown in Table 2.

EXAMPLE IV

One Step Conversion of Diether-Linked Phthalonitrile Resin Into Highly Conductive Material at 900° C.

4,4'-Bis(3,4-dicyanophenoxy) biphenyl 4 (1.41 g) was weighed into an aluminum planchet, melted and degassed at reduced pressure. 4,4'-methylenedianiline (0.015 g) was added to the melt and thoroughly mixed by stirring. The sample was heated at 250° for 4 hours and at 280° C. for 20 hours. The solid polymer (insulator) was then heated to 900° C. at a programmed rate of 0.2° C. min. and was kept at 900° C. for 75 hours and then slowly cooled at a programmed rate of 0.2° C./min. The room temperature electrical conductivity, after being heated at 900° C., was $2.0 \times 10^{+2}$ ohm$^{-1}$cm$^{-1}$.

EXAMPLE V

Synthesis of 1,3 Bis(3,4-Dicyanophenoxy) Benzene

A mixture of 5.5 g (0.05 mol) of resorcinol, 17.3 g (0.10 mol) of 4-nitrophthalonitrile, 20.8 g (0.15 mol) of anhydrous potassium carbonate and 60 ml of dry dimethyl sulfoxide was stirred at 80°–90° C. for 5 hours under a nitrogen atmosphere. After cooling, the resulting dark mixture was poured into 300 ml of cold dilute hydrochloric acid. The solid precipitate which separated was washed with water until the washings were neutral. The product was then collected by suction filtration. Recrystallization from acetone-water yielded 10.7 g (60%) of the desired product, m.p. 183°–186° C.

EXAMPLE VI

One Step Conversion of Diether-Linked Phthalonitrile Resin Into Highly Conductive Material at 800° C.

1,3-Bis (3,4-dicyanophenoxy) benzene (1.81 g) was weighed into an aluminum planchet, melted and degassed at reduced pressure. 4,4'-methylenedianiline (0.019 g) was added to the melt and thoroughly mixed by stirring. The melt quickly darkened. The sample was heated at 230° C. for 4 hours and at 270° C. for 20 hours. The resulting thermosetting polymer was heated at a programmed rate of 0.2° C./min. to 800° C. and kept at 800° C. for 75 hours. The sample was then cooled at a programmed rate of 0.2° C./min. The room temperature electrical conductivity, after being heated at 800° C., was $8.9 \times 10^{+1}$ ohm$^{-1}$cm$^{-1}$.

Conductive polymers have potential usage in such things as light-weight batteries, electrical devices, low-cost solar cells, electromagnetic interference shields for computers and sensitive circuitry, and many other electronic applications. They could be especially useful in space and military applications, where the low weight, corrosion resistance and environmental stability of polymers are important.

The wide range potential use for conductive materials certainly include any electronic equipment that could preferably be made lightweight by the use of electromagnetic radiation shields made from a lightweight conductive polymer instead of metal. In particular home computers and video equipment which emit radiation that interferes with television reception and electromagnetic radiation in general can be made lighter and less expensive by replacing metal electromagnetic radiation shields with these structurally sound, economically manufactured, lightweight conductive polymers.

In summary, the polymers of the present process have several advantages; the conductive materials are easily fabricated and are insensitive to air; the monomer synthesis 1 is short, simple and potentially low-cost; the monomer can be easily fabricated into plastic components, making it adaptable to a wide variety of useful configurations; and the conductivity of 5 does not change significantly on exposure to air.

This combination of desired properties clearly enhances the importance of polymer 5 as a future candidate for electronic applications. Since polymer 5 has desirable mechanical properties even after being heated at 700°-800° C., components can be fabricated and studied for possible use as high temperature diodes, transistors, and other electronic aplications.

Obviously many modifications and variations of the present invention are possible in light of the above teachings. In particular, variations in the reaction time and temperature can produce a polymer with the same conductivity. It is therefore to be understood that within the scope of the appended claims the invention may be practiced otherwise than as specifically described.

TABLE I

Effect of Heat Treatment With Time on Electrical Conductivity of 4,4'-Bis (3,4-Dicyanophenoxy) Biphenyl Resin.

| Temp °C. | Atm. | Conductivity (ohm cm)$^{-1}$ | Time (Hours) |
|---|---|---|---|
| 280 | Air | insulator | 24 |
| 300 | inert | insulator | 24 |
| 400 | inert | insulator | 24 |
| 500 | inert | $1.0 \times 10^{-8}$ | 24 |
| 600 | inert | $2.7 \times 10^{-5}$ | 24 |
| 700 | inert | $1.5 \times 10^{-2}$ | 24 |
| 700 | inert | $2.5 \times 10^{+1}$ | 100 |

TABLE II

Effect of Heat Treatment With Time on Electrical Conductivity of 4,4'-Bis (3,4-Dicyanophenoxy) Biphenyl Resin

| Temp °C. | Atm. | Conductivity (ohm cm)$^{-1}$ | Time (Hours) |
|---|---|---|---|
| 280 | Air | insulator | 24 |
| 300 | inert | insulator | 100 |
| 400 | inert | insulator | 100 |
| 500 | inert | $1.0 \times 10^{-8}$ | 100 |
| 600 | inert | $4.4 \times 10^{-1}$ | 100 |
| 600 | inert | $2.2 \times 10^{+1}$ | 200 |
| 700 | inert | $3.0 \times 10^{+1}$ | 100 |
| 800 | inert | $6.4 \times 10^{+1}$ | 100 |

What is claimed and desired to be secured by Letters Patent of the United States is:

1. A process for producing conductive polymers from diether-linked bisorthonitrile monomers, comprising the steps of:

mixing said monomer having the formula;

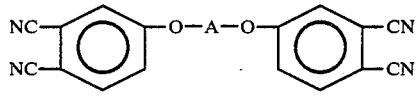

wherein A is selected from the group consisting of phenyl radicals, polyphenyl radicals, and fused aromatic poly-ring radicals, with an amine;

heating said monomer and amine mixture in an oxygen containing atmosphere to a polymerization temperature above said monomers melting point but below the resulting polymers thermal-oxidative decomposition temperature;

heating said polymer to an elevated temperature between 400°-900° C. in an inert atmosphere thereby eliminating oxidative degradation; and controlling said elevated temperature to yield a conductive, thermally stable, and oxidative resistant polymer with a conductivity that is a function of the elevated temperature.

2. The process of claim 1 wherein said phenyl radicals are selected from the group consisting of —φ—φ— and —φ— with the phenyl groups linked at the para or meta position.

3. The process of claim 1 wherein said fused poly-ring radical is selected from the group consisting of naphthalene, phenanthrene, and anthracene.

4. The process of claim 1 wherein said elevated temperature has a range from 400° C. to 900° C.

5. The process of claim 1 wherein said amine is an aromatic amine, thermally stable after being incorporated into the polymer over the temperature range from 200° C. to 1200° C.

6. The process of claim 5 wherein said aromatic amine is selected from the group consisting of p-phenylenediamine, 4,4'-methylenedianiline, m-phenylenediamine, 4-aminophenyl ether, 4,4'-(phenylenedioxy) dianiline, and 4-aminophenyl sulfone.

7. The process of claim 1 wherein said amine is 0.2 to 20 percent by weight of said monomer-amine mixture.

8. The process of claim 7 wherein said amine is 0.5 to 10 percent by weight of said monomer-amine mixture.

9. The process of claim 8 wherein said amine is 1 to 2 percent by weight of said monomer-amine mixture.

10. The polymers of the process of claim 1.

11. A process for producing conductive polymers from diether-linked bisorthonitrile monomers, comprising the steps of:

mixing said monomer having the formula:

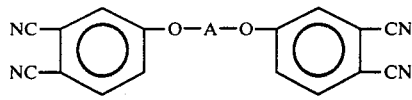

wherein A is selected from the group consisting of —φ—φ— and —φ— linked at the metal or para positions, with an aromatic amine selected from the group consisting of p-phenylenediamine, 4,4'-methylenedianiline, m-phenylenediamine, 4-aminophenyl ether, 4,4'-(phenylenedioxy) dianiline, and 4-aminophenyl sulfone;

heating said monomer and amine mixture in an oxygen containing atmosphere to a polymerization temperature above said monomers melting point but below said polymers thermal-oxidative decomposition temperature;

heating said polymer to an elevated temperature between 400°–900° C. in an inert atmosphere thereby eliminating oxidative degradation; and controlling said elevated temperature to yield a conductive, thermally stable, and oxidative resistant polymer with a conductivity that is a function of the elevated temperature.

12. The process of claim 11 wherein said amine is 0.2 to 20 percent by weight of said monomer-amine mixture.

13. The process of claim 12 wherein said amine is 0.5 to 10 percent by weight of said monomer-amine mixture.

14. The process of claim 13 wherein said amine is 1 to 2 percent by weight of said monomer-amine mixture.

15. The product of the process of claim 11.

* * * * *